US008897255B2

(12) United States Patent
Beser

(10) Patent No.: US 8,897,255 B2
(45) Date of Patent: *Nov. 25, 2014

(54) DYNAMIC VLANS IN WIRELESS NETWORKS

(75) Inventor: Nurettin Burcak Beser, Sunnyvale, CA (US)

(73) Assignee: Telsima Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/748,476

(22) Filed: May 14, 2007

(65) Prior Publication Data

US 2009/0028116 A1 Jan. 29, 2009

Related U.S. Application Data

(60) Provisional application No. 60/747,165, filed on May 12, 2006, provisional application No. 60/747,170, filed on May 12, 2006.

(51) Int. Cl.
| | | |
|---|---|---|
| H04W 4/00 | (2009.01) | |
| H04L 12/28 | (2006.01) | |
| H04W 36/00 | (2009.01) | |
| H04L 12/46 | (2006.01) | |

(52) U.S. Cl.
CPC .................................. *H04L 12/4645* (2013.01)
USPC ........ 370/331; 370/395.53; 455/437; 455/438

(58) Field of Classification Search
CPC .................. H04W 36/00111; H04W 36/0055; H04W 36/32; H04L 12/4645
USPC .................... 370/395.53, 329, 331, 341, 349; 455/437, 438
See application file for complete search history.

(56) References Cited

U.S. PATENT DOCUMENTS

| | | | | |
|---|---|---|---|---|
| 6,041,358 | A * | 3/2000 | Huang et al. ................... | 709/238 |
| 6,181,699 | B1 * | 1/2001 | Crinion et al. ................. | 370/392 |
| 6,947,739 | B2 * | 9/2005 | Yokoyama ................. | 455/426.2 |
| 7,693,513 | B2 | 4/2010 | Chou | |
| 2002/0191567 | A1 | 12/2002 | Famolari et al. | |
| 2004/0202171 | A1 | 10/2004 | Hama | |
| 2005/0163131 | A1 * | 7/2005 | Tonnby et al. ........... | 370/395.53 |
| 2005/0171995 | A1 * | 8/2005 | Grindahl et al. .............. | 709/200 |
| 2006/0007939 | A1 * | 1/2006 | Elangovan ............... | 370/395.53 |

(Continued)

OTHER PUBLICATIONS

International Search Report issued Sep. 11, 2008 in corresponding PCT/US2007/11658.

(Continued)

*Primary Examiner* — Un C Cho
*Assistant Examiner* — Jeremy Costin
(74) *Attorney, Agent, or Firm* — Sheppard, Mullin, Richter & Hampton LLP

(57) ABSTRACT

Systems and methods are described for managing a wireless network. Packets addressed to subscriber stations may be assigned a tag based on the base station at which the packet is received and the base station at which the subscriber station first entered the network. The tag can identify a media access address associated with subscriber equipment accessible through the subscriber station and an IP address associated with the subscriber equipment. The tag may be obtained from a table linking each of a plurality of virtual local area networks to one or more subscriber stations previously registered at a network base station.

12 Claims, 13 Drawing Sheets

(56) References Cited

U.S. PATENT DOCUMENTS

| | | |
|---|---|---|
| 2006/0130126 A1* | 6/2006 | Touve et al. ................ 726/5 |
| 2006/0182123 A1* | 8/2006 | Monette et al. .......... 370/395.53 |
| 2007/0053353 A1 | 3/2007 | Lee et al. |
| 2007/0064673 A1* | 3/2007 | Bhandaru et al. ............. 370/351 |
| 2008/0069024 A1 | 3/2008 | Iino |

OTHER PUBLICATIONS

International Search Report issued Apr. 21, 2008 in corresponding PCT/US2007/11660.

Office Action mailed Jul. 12, 2010 from U.S. Appl. No. 11/748,468, filed May 14, 2007.

Office Action mailed Mar. 30, 2011 from U.S. Appl. No. 11/748,468, filed May 14, 2007.

International Application No. PCT/US2007/011660, Search Report and Written Opinion mailed Apr. 21, 2008.

International Application No. PCT/US2007/011658, Search Report and Written Opinion mailed Sep. 11, 2008.

* cited by examiner

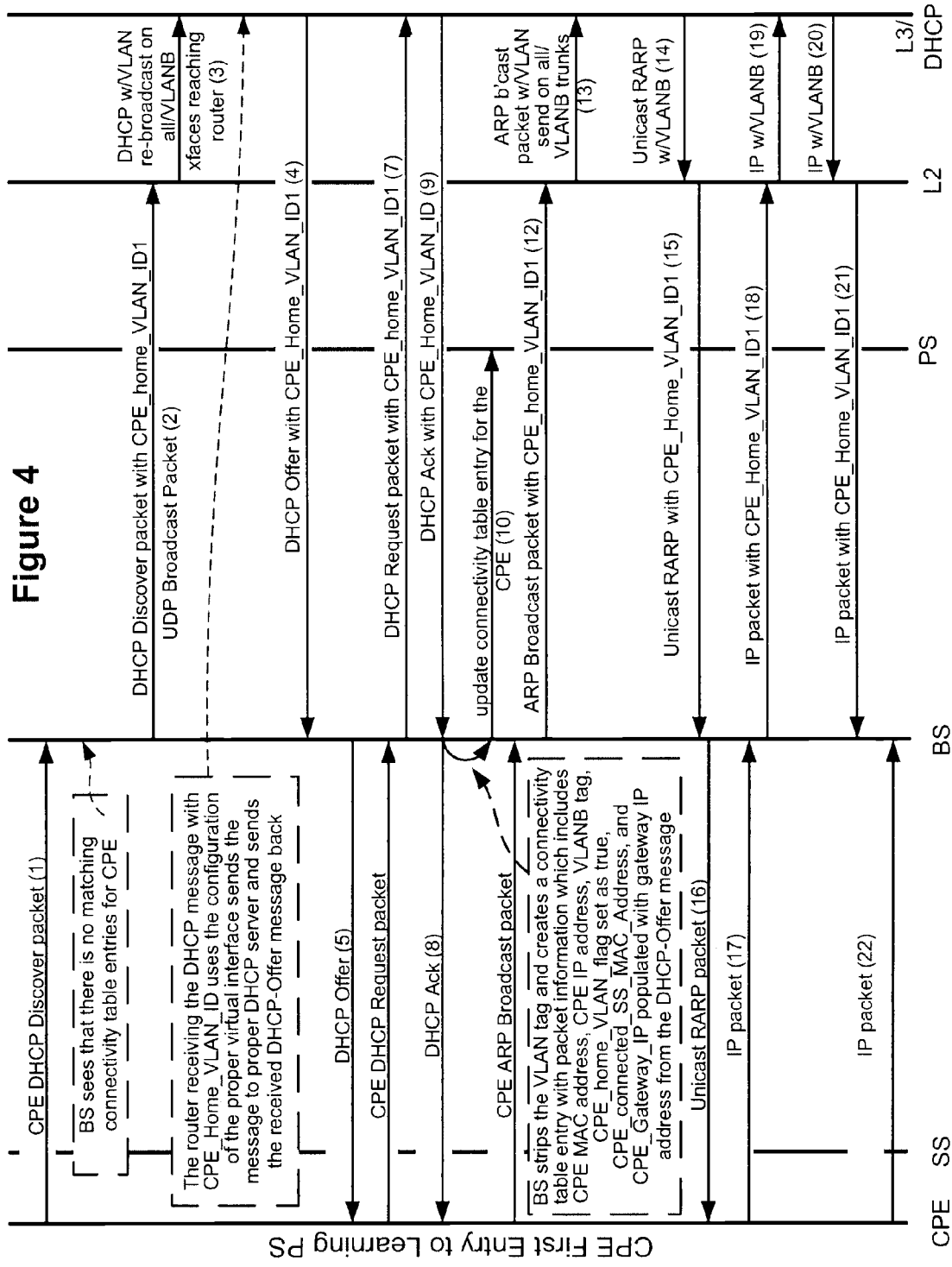

DYNAMIC VLANS IN WIRELESS NETWORKS

CROSS-REFERENCE TO RELATED APPLICATIONS

This Application claims priority to and incorporates by reference herein U.S. Provisional Application Ser. No. 60/747,165 filed May 12, 2006 and entitled "Dynamic VLANs," and further claims priority to and incorporates by reference herein U.S. Provisional Application Ser. No. 60/747,170 filed May 12, 2006 and entitled "Dynamic VLAN IP Network Entry."

BACKGROUND OF THE INVENTION

1. Field of the Invention

The present invention relates generally to wireless terminals and more particularly to the mobility of addressing in wireless networks.

2. Description of Related Art

Wireless Broadband Access ("WBA") based systems have been designed to have operational characteristics that are indistinguishable from Cable or DSL methods of broadband access from the viewpoint of the customer. However, wireless systems are subject to network termination resulting from signal fading and subscriber mobility and subscriber equipment may be connected to the network through any of multiple network termination points. In contrast, DSL Modems can connect to a single DSLAM along a single physical cable that is shielded against external noise and thus, DSL systems does exhibit fading or have multiple termination points. In cable systems, a shielded coaxial cable connects the modem to a CMTS and relatively minor fading occurs due to various factors. Even in a multiple CMTS system, every CMTS experiences similar levels of fading and a cable modem is typically redirected to its originally connected CMTS when a disconnection occurs.

Wireless systems may be viewed as multiple logical modems connected through different Network Termination points via different virtual cables, where the system is able to pick the best signal strength at the time that it is connected to an end-point. As time passes fading on the virtual cable causes the logical modem to disconnect from its current base station and the subscriber station directs the modem to reconnect based on best available signal strength. This behavior can be repeated many times. Fading may be apparently random or based on predictable patterns.

Customer premises equipment ("CPE"), such as a personal computer ("PC"), may respond to fading by disconnecting from the network. Upon reconnection, conventional systems generally assign a new IP address thereby causing shut-down all prior network connections in use by application in the CPE. Active connections, whether IP streaming or download in progress, have to be terminated and re-started using the newly-obtained IP address. Also, in many business uses, connections are made from the Internet to the CPE as well from the CPE to the Internet. For these connections, the CPE IP address must be advertised when changed. Even when a dynamic domain name service ("dynamic DNS") method is implemented, DNS update can be a slow process, taking hours and sometimes days to propagate through the Internet.

For bridged base stations, the interaction of the base stations between which the subscriber connection transfers is significant. If the base stations are not in the same layer-2 network, then the latterly described problems apply. When the two base stations are within the same layer-2 network, the CPE need not change IP addresses and generally experiences a brief period of packet drop measurable in seconds. However, a new set of network topology problems will be observed. For example, any broadcast packet will be repeated over all connected base stations, potentially causing a broadcast storm. Malicious users could use broadcast storms to run theft of service and denial of service attacks. Furthermore, identification and debugging of network problems is made difficult.

The use of Dynamic VLANs may solve broadcast storm issues and may provide some IP address mobility. However, the initial IP address and VLAN assignment process can cause random distribution of IP addresses, resulting in an expanded and sometimes uncontrollable broadcast domain.

BRIEF SUMMARY OF THE INVENTION

Certain embodiments of the invention provide systems and methods for managing a wireless network, comprising receiving a packet addressed to a subscriber station in a wireless network; and assigning a tag to the packet based on the interface at which the packet is received, wherein the tag identifies a network connection assigned to the subscriber station by a base station at which the subscriber station first entered the network. The tag can identify a media access address and/or an IP address associated with subscriber equipment accessible through the subscriber station. The tag may be maintained in a list of tags maintained by or for a plurality of base stations. Assigning a tag can include obtaining the tag from a table linking each of a plurality of virtual local area networks to one or more subscriber stations previously registered at a network base station.

Certain embodiments provide systems and methods for managing virtual local area networks ("VLANs"), comprising maintaining a table linking each of a plurality of network tags to a corresponding one of a plurality of unique identifiers, each network tag identifying an initial base station at which subscriber equipment initially entered a wireless network, receiving a packet at a base station the packet including an identifier of a certain subscriber equipment tagging the packet with a network tag corresponding to the identifier, the network tag obtained by querying the table with the identifier, and directing the packet to the certain subscriber equipment regardless of its location in the wireless network. A second base station can identify the subscriber equipment from the table upon a subsequent entry of the certain subscriber equipment to the wireless network. The use of Dynamic VLANs may solve broadcast storm issues and may provide some IP address mobility. However, the initial IP address and VLAN assignment process can cause random distribution of IP addresses, resulting in an expanded and sometimes uncontrollable broadcast domain. The use of Dynamic VLANs may solve broadcast storm issues and may provide some IP address mobility. However, the initial IP address and VLAN assignment process can cause random distribution of IP addresses, resulting in an expanded and sometimes uncontrollable broadcast domain. The unique identifier can include an IP address and/or a media access address associated with the subscriber equipment or computer equipment that comprises the subscriber equipment.

BRIEF DESCRIPTION OF THE DRAWINGS

The structural and functional aspects of the invention will become understood by those skilled in the art by reference to the following detailed description when taken in conjunction with the appended drawings, in which:

FIGS. 4-9B depict communications transactions according to certain aspects of the invention.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments enable the provision of wireless broadband access services that appear to have the same characteristics as wired ADSL or cable network services. Accordingly, inherent differences between wireless and wired network designs are accommodated and, in some embodiments, concealed. Differences between wired and wireless services include the effects of unpredictable fading that can occur in wireless networks and which can cause a subscriber station to occasionally disconnect from one base station and reconnect to a different base station.

Figure 1:
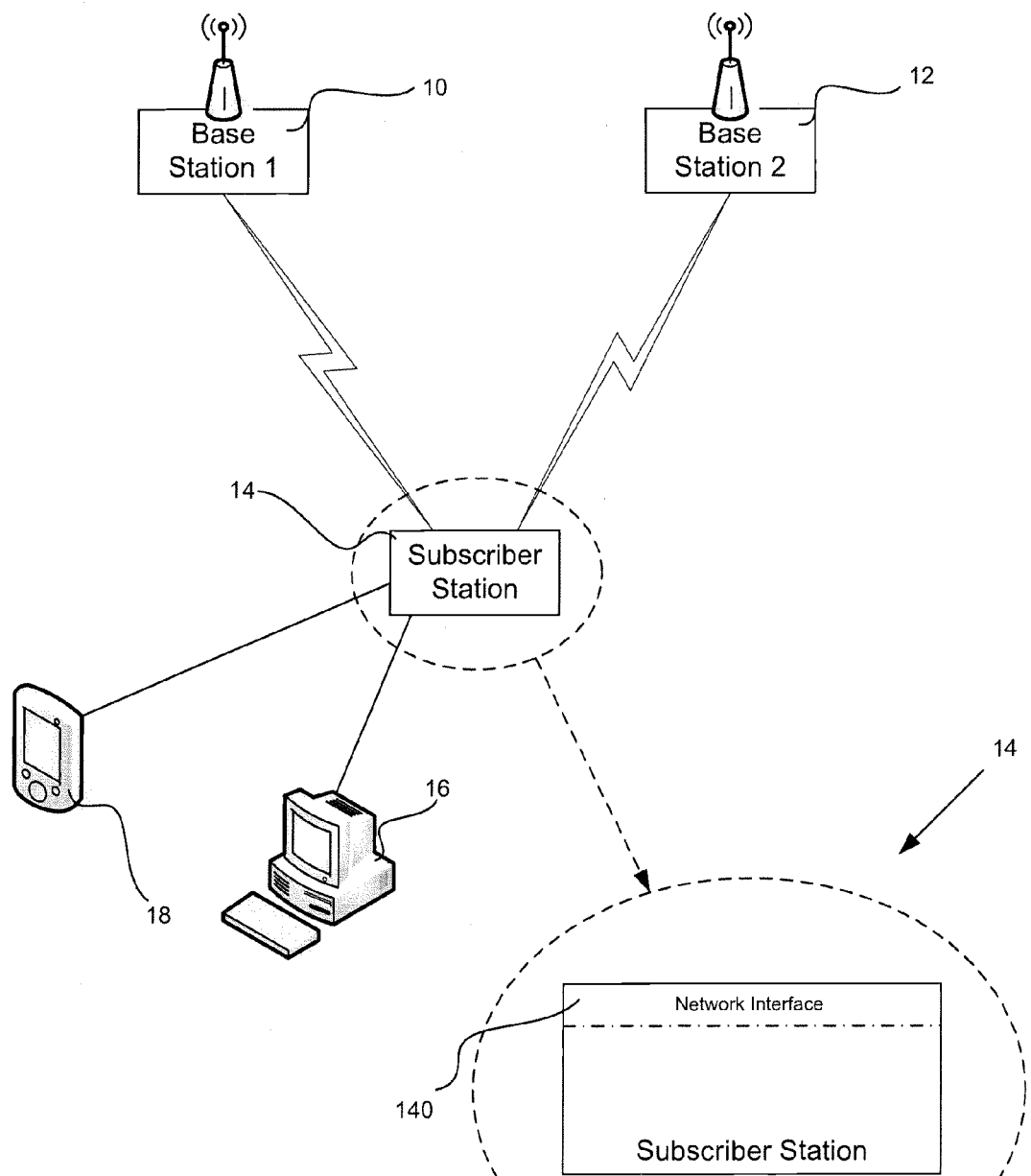
FIG. 1 illustrates a simple example of a wireless network.

With reference to FIG. 1, certain embodiments employ an architecture that can be implemented without significantly increasing system operational complexity and requiring little additional computation power. In one example, a subscriber station 14 includes a network interface 140 that can detect a first base station 10 and a second base station 12. The base stations 10 and 12 may provide signals from the same network using same or different frequencies, same or different modulation schemes and same or different data encoding standards. In some embodiments, subscriber station 14 may be configurable to communicate with base stations of different wireless networks. Certain aspects of the invention facilitate the construction of low-cost, reliable networks using, at the core, existing wireless infrastructure and components. Certain embodiments provide configuration methods together with a plurality of components, features and capabilities that address issues existing in conventional systems. In one example, the provided components can include debugging and maintenance tools that ease management of layer-2 networks that are otherwise difficult to maintain and debug due to their inherently flat topography. Debugging and maintenance tools may be configured and operated using customized configuration methods and interfaces. In many embodiments, the architecture may be implemented from combinations of existing network equipment.

Figure 2:
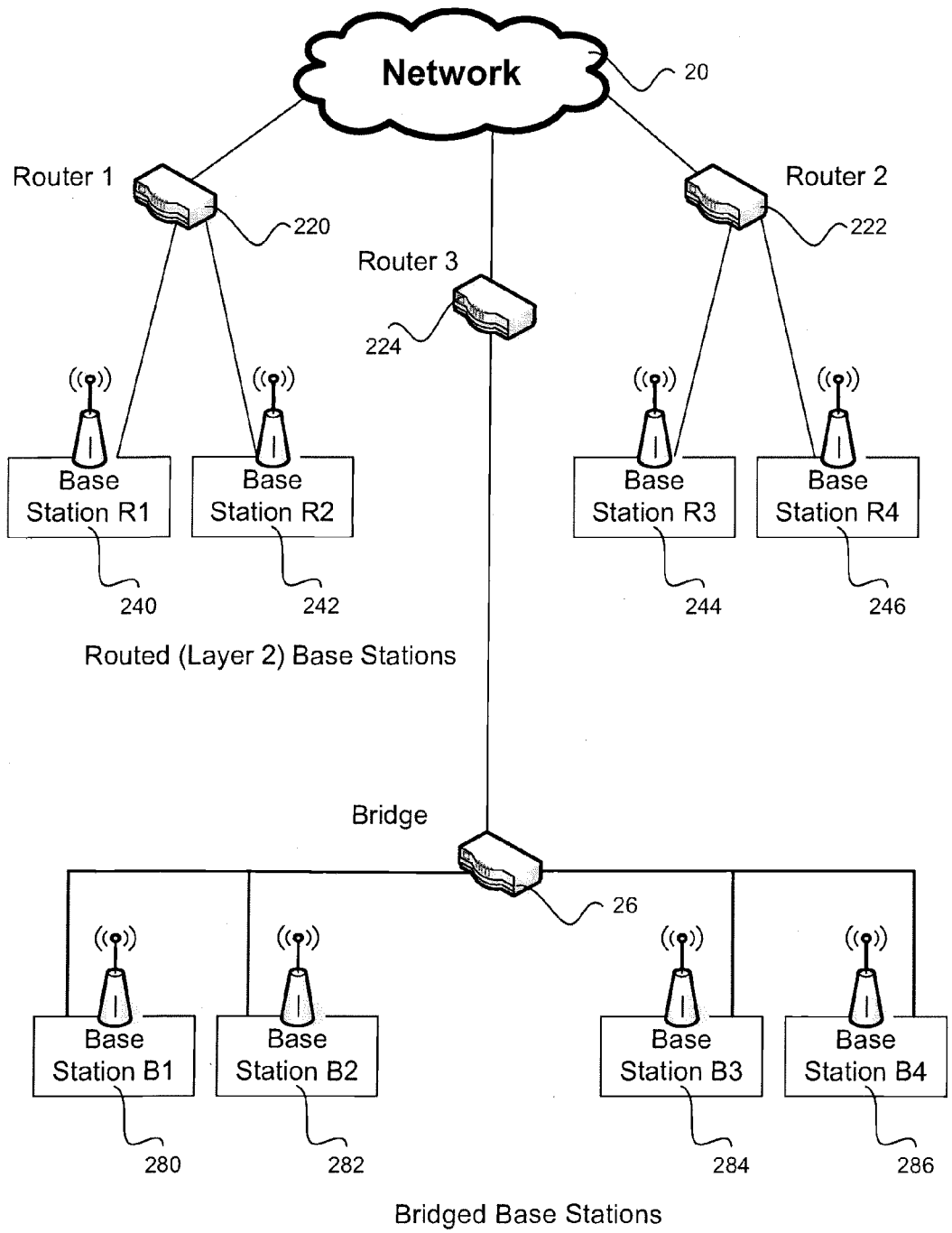
FIG. 2 depicts a network configuration comprising bridged and routed base stations.

FIG. 2 provides a simplified illustration of network topographies that can be used to connect base stations. In the example provided, routed base stations 240, 242, 244 and 246 connect to one another and to a network 20 through routers 220 and 222. Bridged base stations 280, 282, 284 and 286 connect to one another through bridge 26 which typically connects to the network 20 using a router 224. Certain embodiments address issues associated with conventional bridged and routed base stations and with conventional hybrid networks that include bridging and routing of base stations. For the purposes of convenience and clarity, the descriptions will highlight methods and systems that address issues prevalent in conventional flat networks that have large numbers of end-nodes, including flat bridged networks.

Certain embodiments provide dynamic tagging of packets at base stations. Dynamic tagging typically assigns tags to packets based on the interface at which the packet is received and other parameters. In one example, standards-based solutions can adapt and utilize existing technologies such as IEEE 802.1Q VLANS. Broadcast messages are not relayed indiscriminately across the network, but are instead rebroadcast only to interfaces that are associated with a common VLAN tag. Dynamic tagging by base stations can resolve issues in conventional networks that provide no reliable agent to tag packets. For example, computer premises equipment cannot be trusted to tag packets consistently and subscriber stations are not required by WiMAX standards to tag packets with persistent VLAN information.

Figure 3:
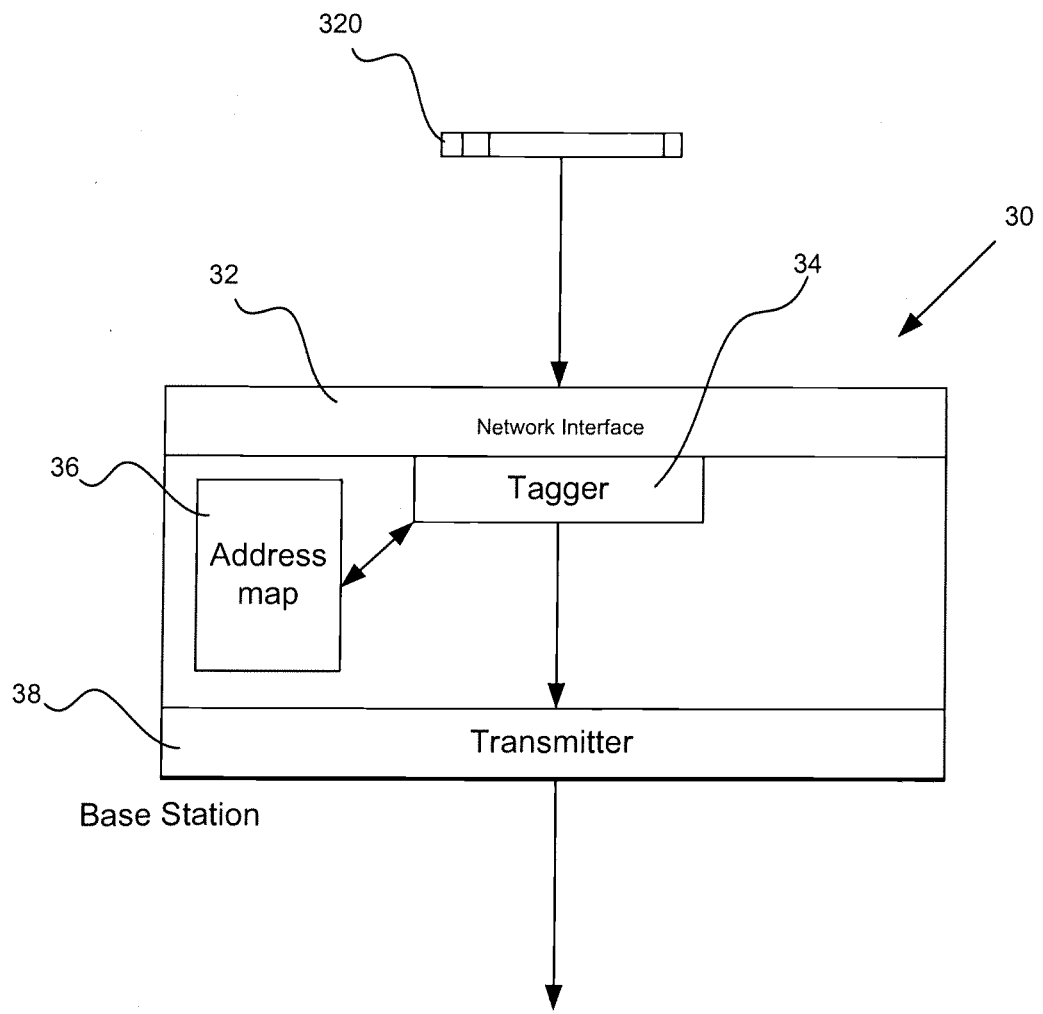
FIG. 3 depicts components of a base station configured according to certain aspects of the invention.
Figure 5A:
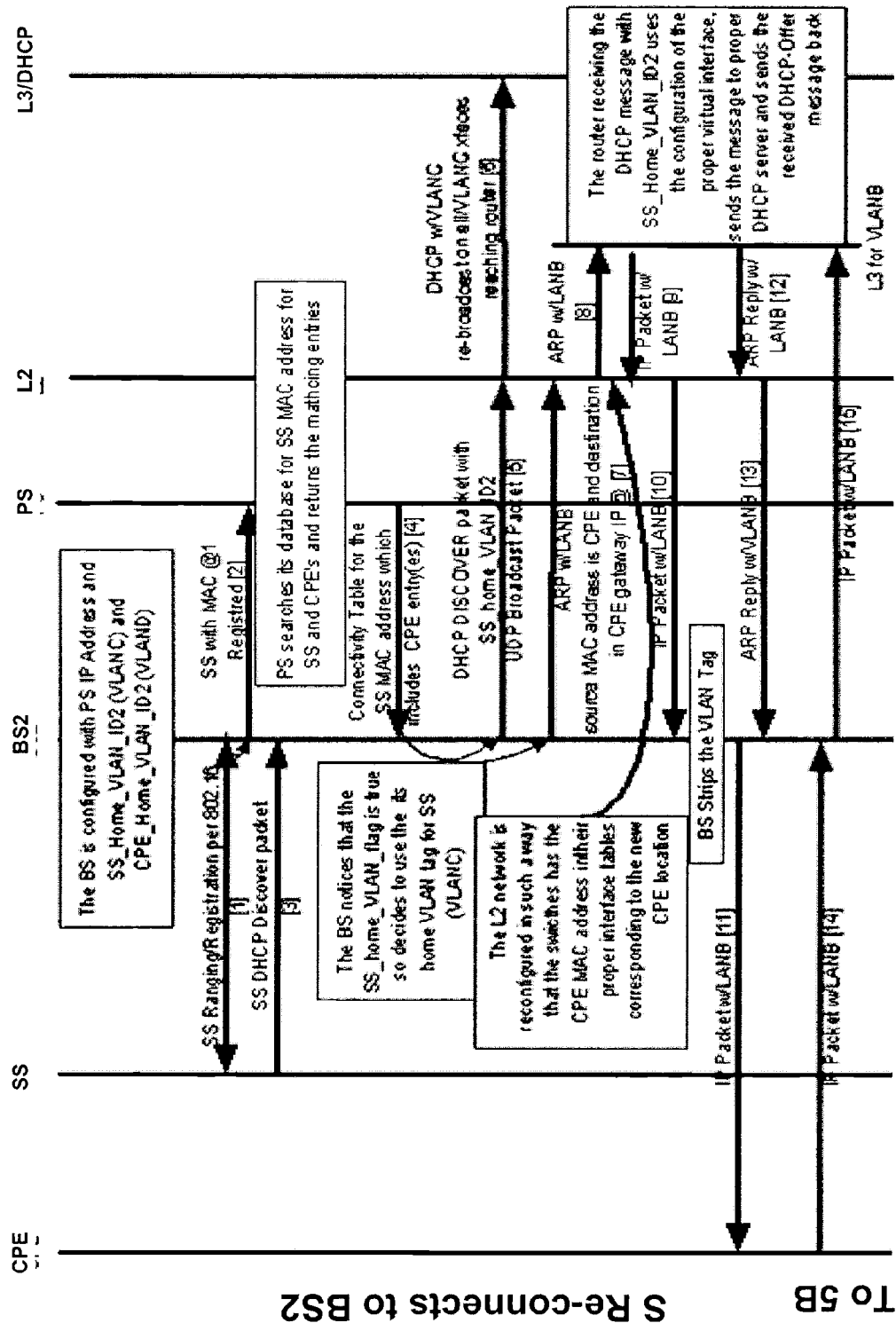
Figure 5B:
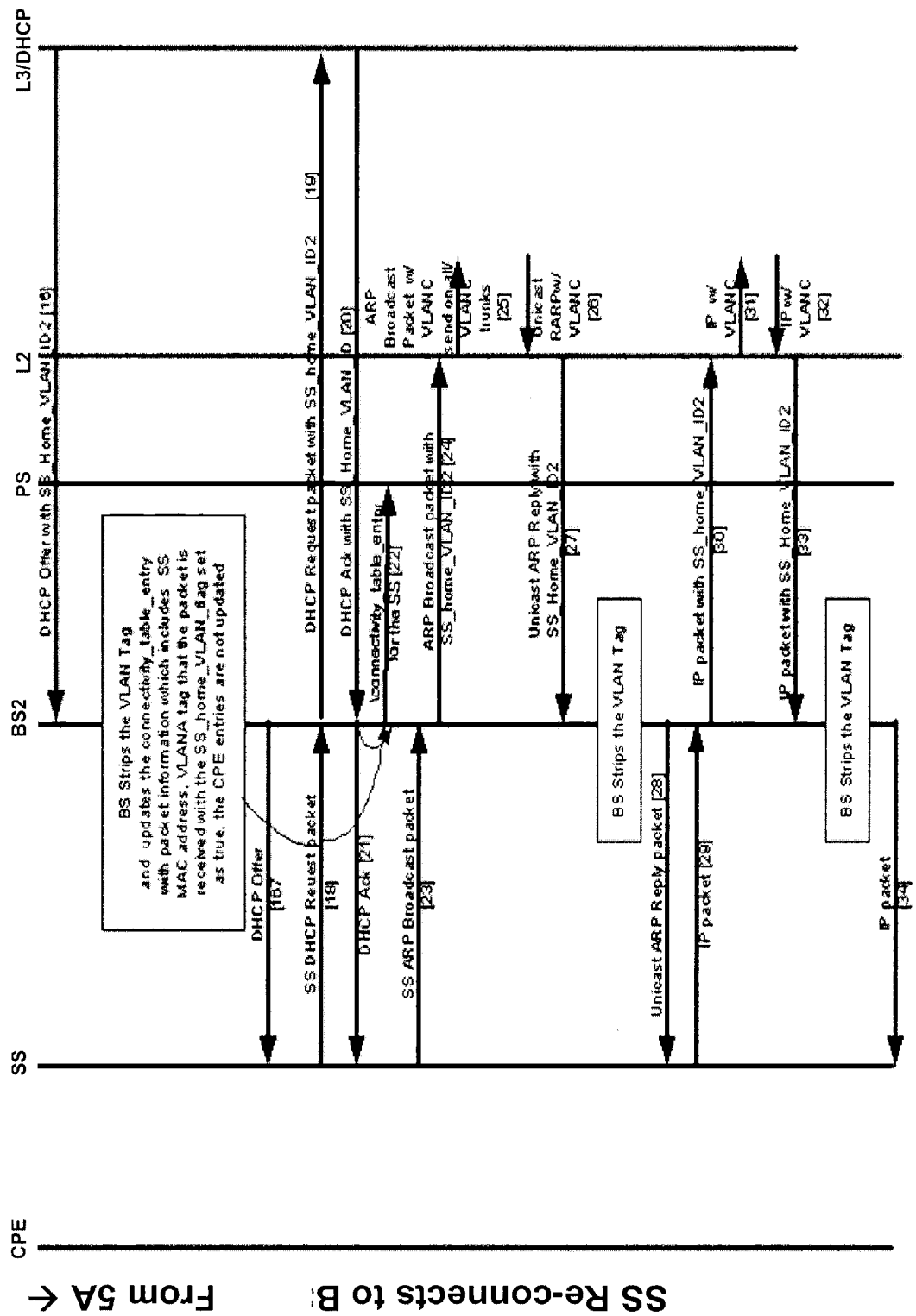
Figure 6:
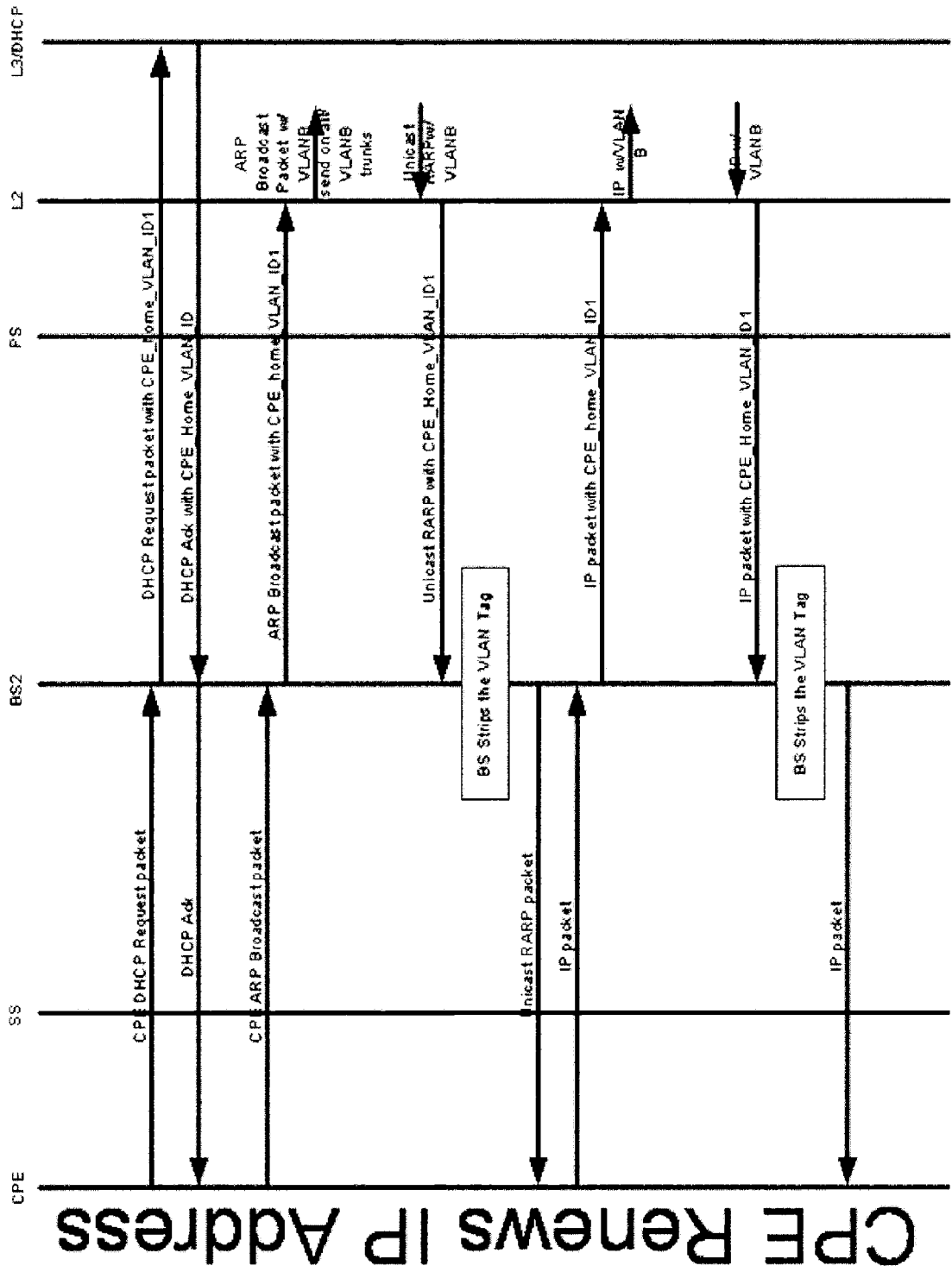
Figure 7A:
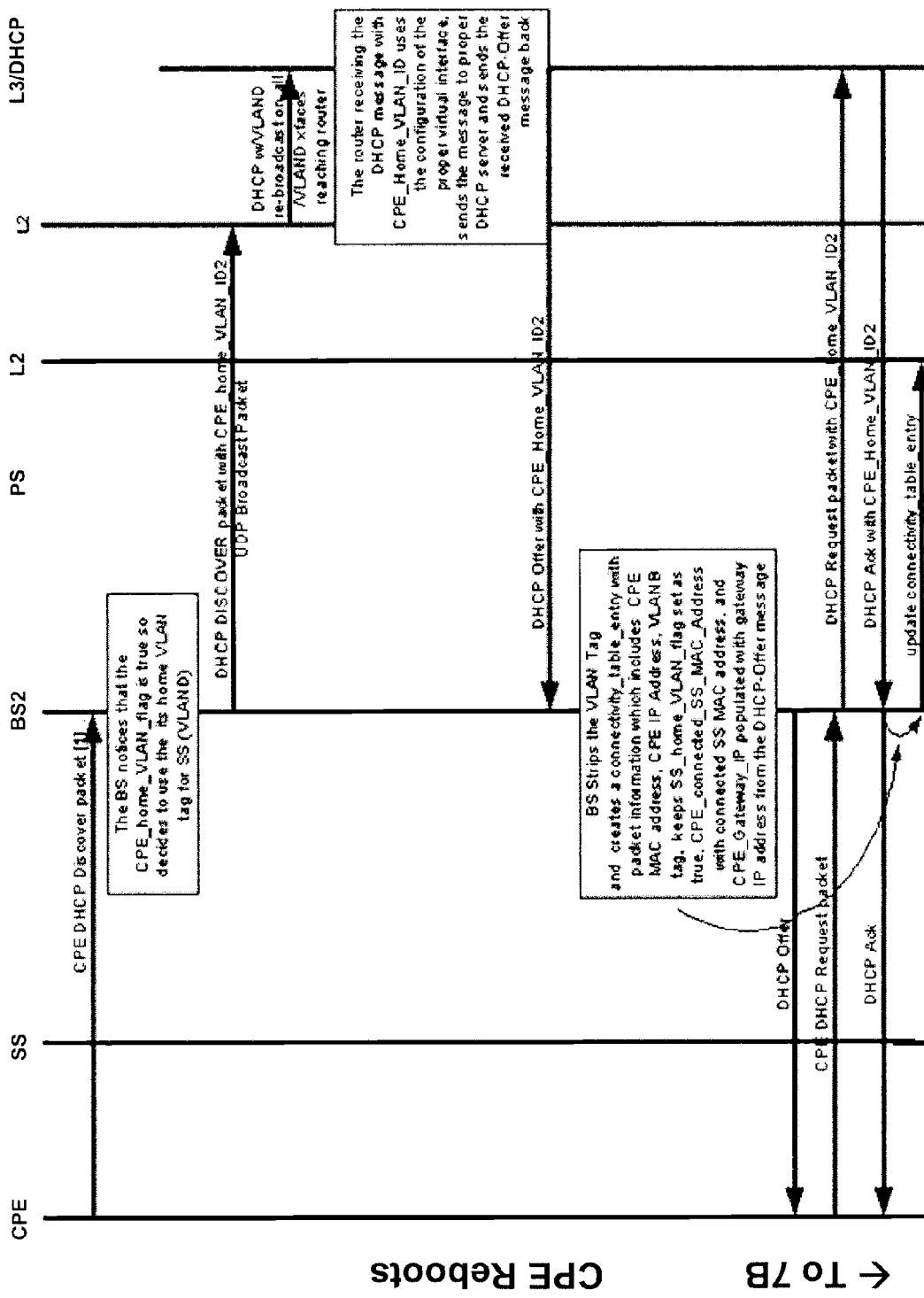
Figure 7B:
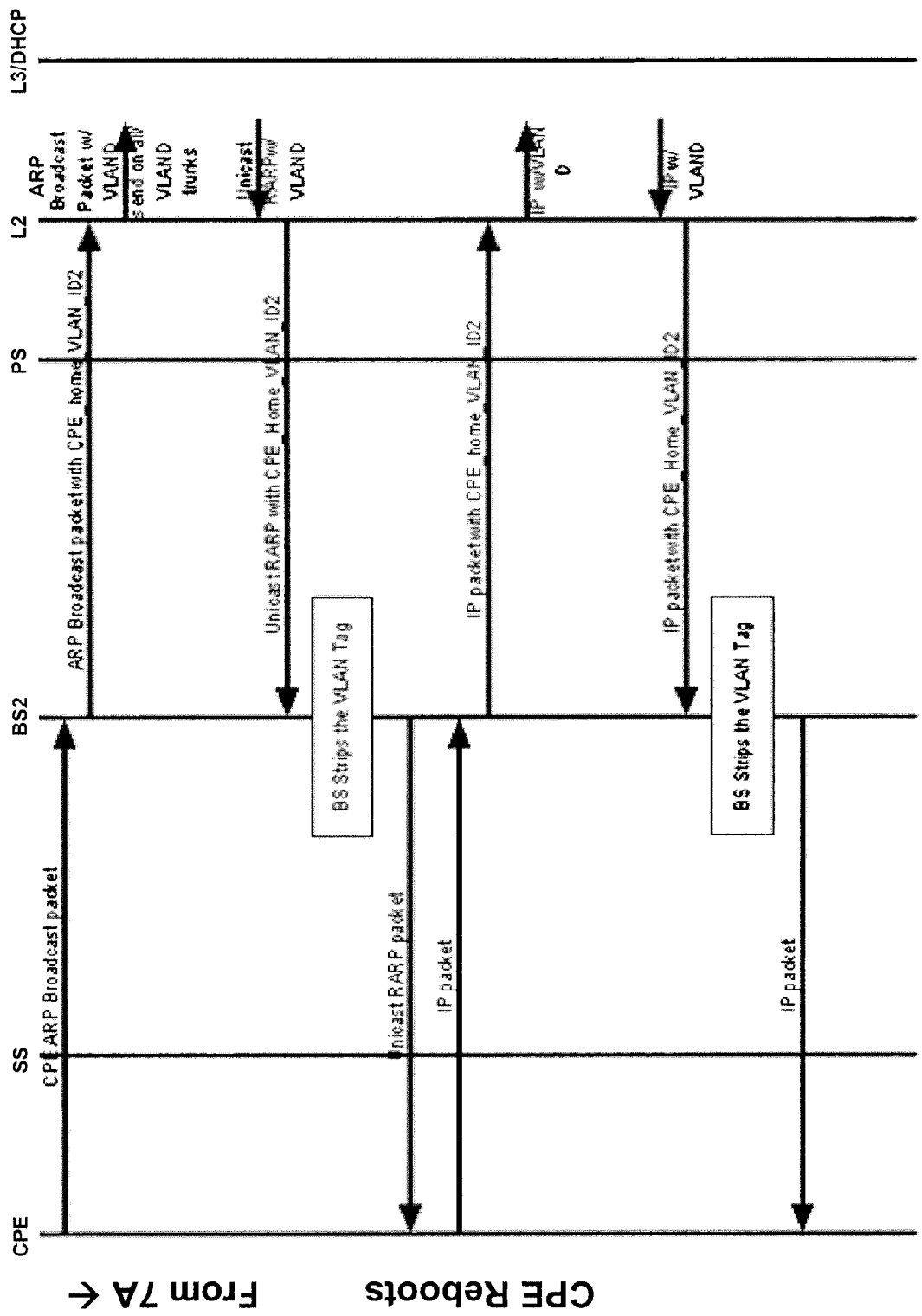
Figure 8A:
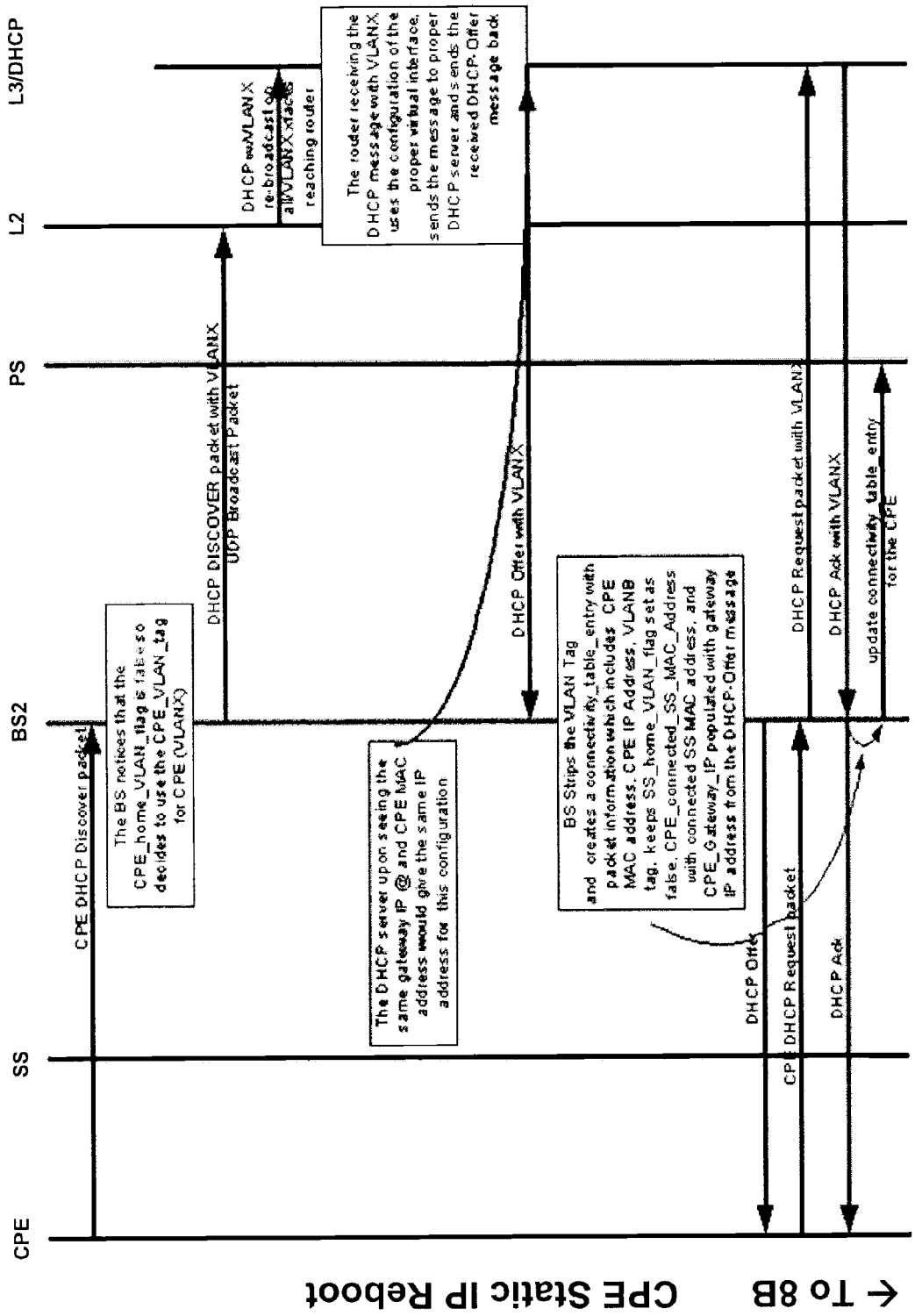
Figure 8B:
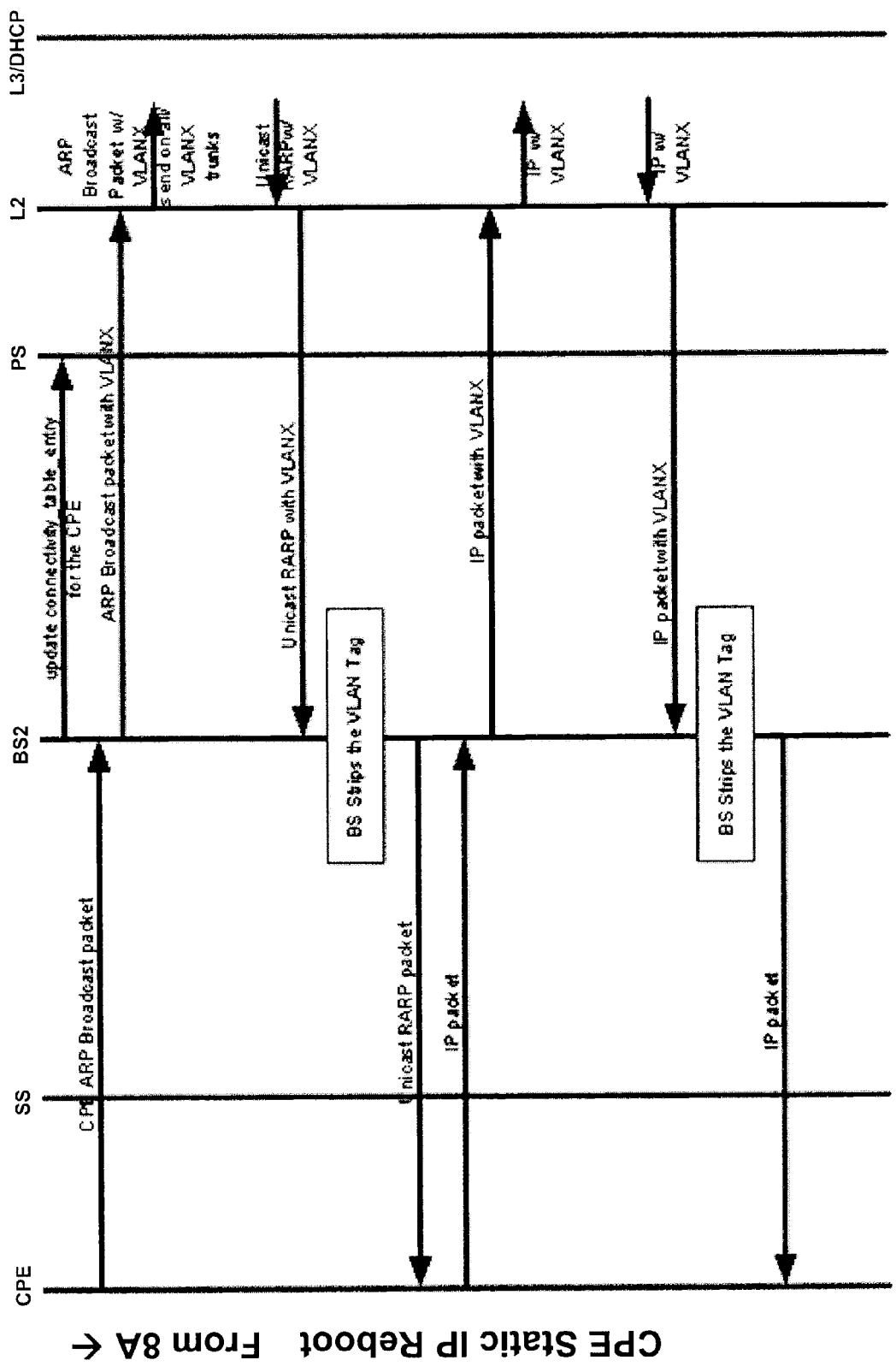
Figure 9A:
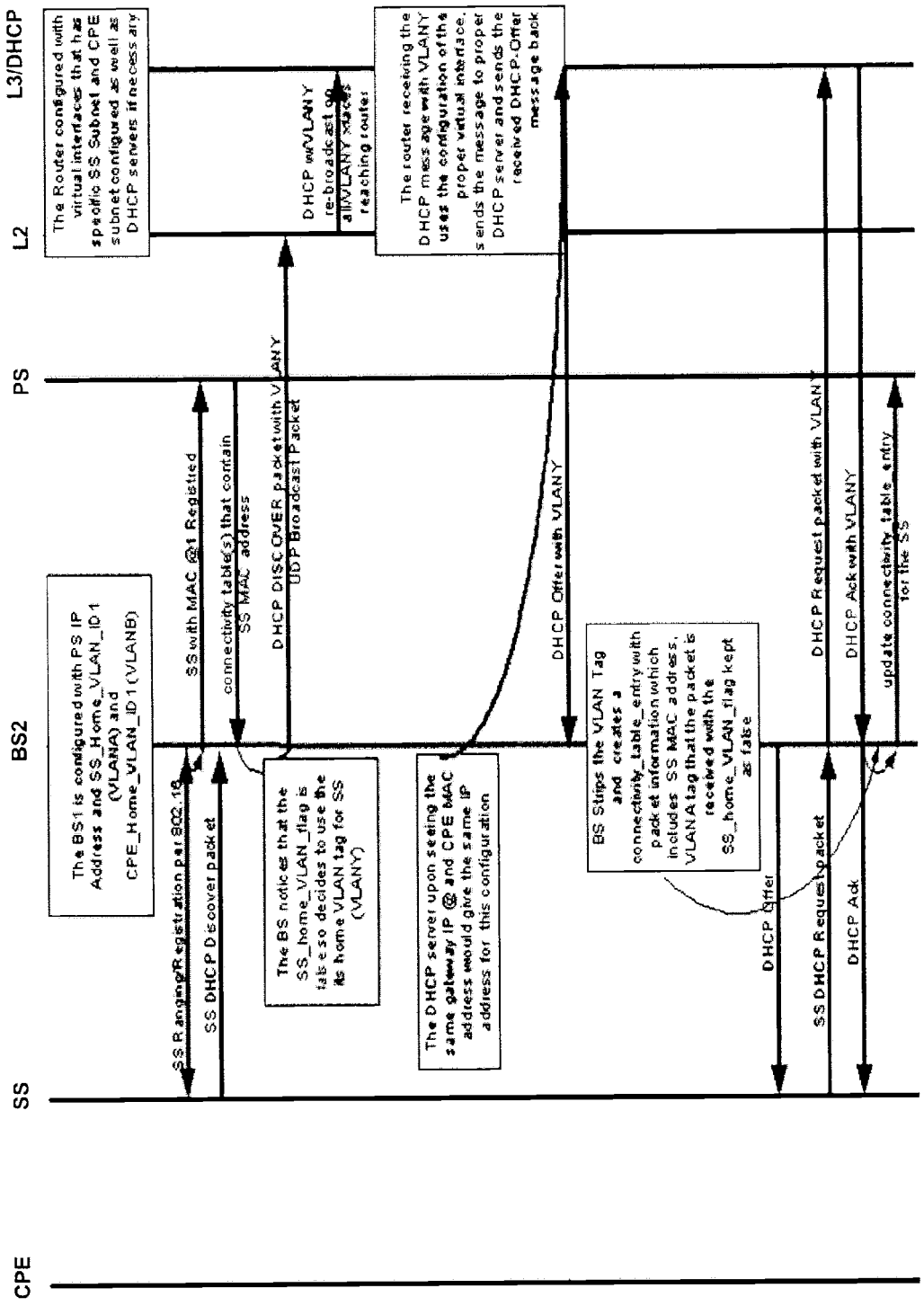
Figure 9B:
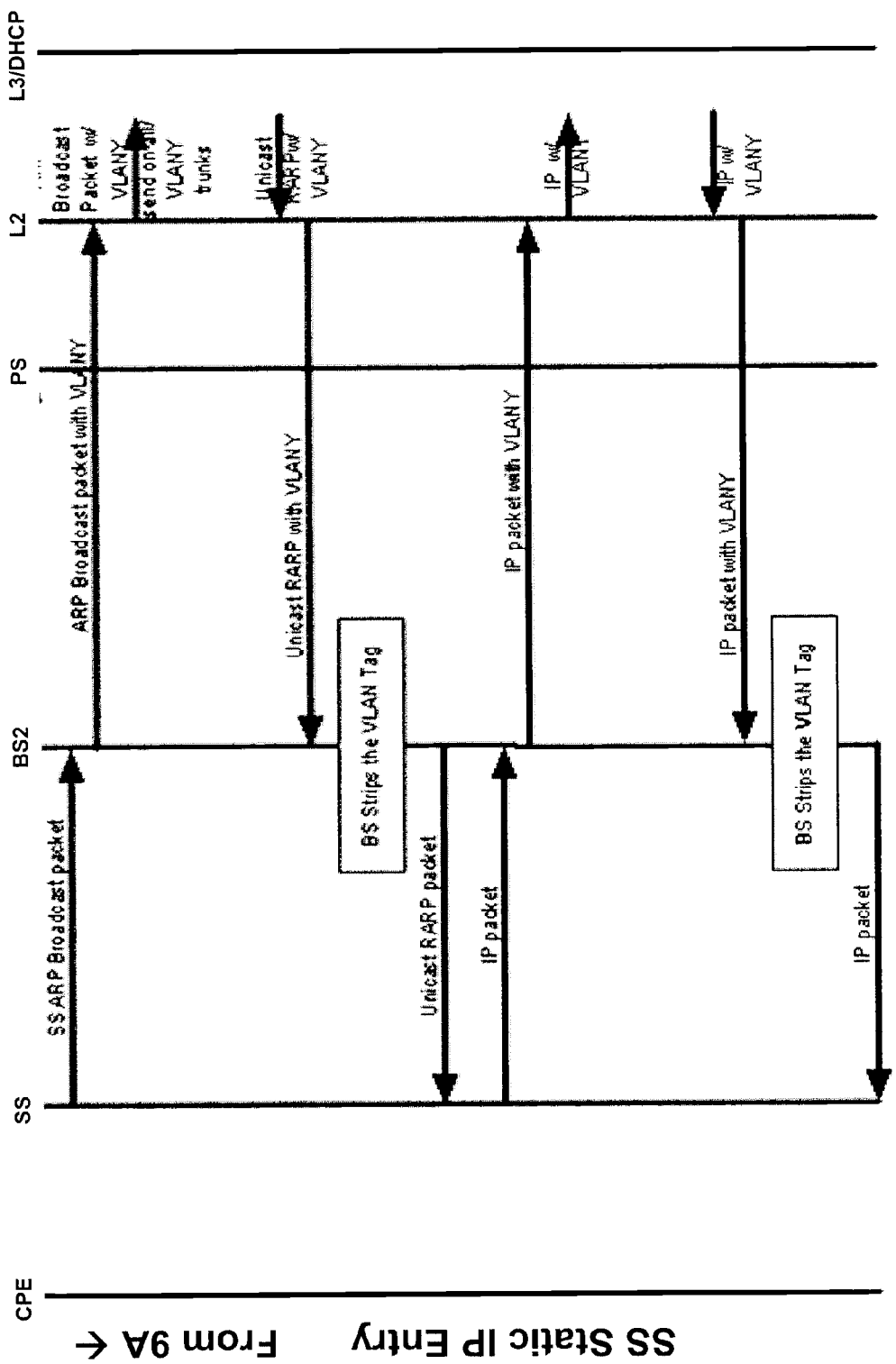

Referring to FIG. 3, in certain embodiments, a base station 30 can be adapted and configured using combinations of hardware and software 34 to tag packets 320 with proper VLAN identification. Typically, the adapted base station 30 is provided with a table 36 for mapping Internet Protocol ("IP") and media access control ("MAC") addresses to one or more VLAN tags. A received packet 320 can be tagged and associated with an appropriate VLAN tag when the packet 320 includes an IP and/or MAC address maintained in the table 36.

In certain embodiments, dynamic tagging is implemented using link session information. The link session information can include a combination of elements such as subscriber station identification, base station identification and MAC address of a subscriber station host. The link session information can be accumulated and provided by the base station. Thus, dynamic tagging permits packet tagging based on information that is not limited to the interface at which the packet is received.

In certain embodiments, a base station can use packet tags to indicate a link which is associated with the host/subscriber station. A corresponding IP address can be distributed through a relay agent instantiated for the link. In one example, packet tagging can conform to standards such as the IEEE 802.1q VLAN standard. In another example, packet tagging can utilize other types of tags such as MPLS tags. In certain embodiments, a base station can use VLAN tags that are statically configured in the base station. When the base station receives a packet it may tag the packet with a corresponding configured VLAN tag.

In certain embodiments, a router located at the edge of a layer-2 network can be configured such that each VLAN tag or each group of VLAN tags is associated with a virtual interface. A virtual interface can be provided such that the instantiation of the virtual interface can be configured based on the IP addressing needs of each base station. It will be appreciated that, in such embodiments, a router interface is effectively extended to the base station. In certain embodiments, a base station may use a Vendor Class Identifier or any other identifier to select a tag for a packet.

In certain embodiments, persistent storage is provided to maintain information describing a network configuration and traffic on the network. This information may indicate rules to be used in routing and tagging packets captured at a base station or subscriber station. The information may be stored as an addressable table, database or in any other suitable format. The information may stored anywhere on the network and multiple copies may be maintained on one or more base stations and subscriber stations.

Typically, a base station maintains a connectivity table that contains parameters including addresses associated with customer premises ("CPE") equipment including CPE and subscriber station MAC addresses ("CPE_MAC_address" and "CPE_connected_SS_MAC_address"), IP address ("CPE_IP_address" and "CPE_Gateway_IP_address"). This table can typically be searched by any of the identifiers. The connectivity table for customer premises equipment may be initialized to predetermined values.

In the examples provided in FIGS. 4-9B, the meaning of the entries is as follows:

CPE_MAC_address: indicates the MAC address for the CPE that this entry is valid for. If this field is zero, the BS can populate the field with new information. If the BS has CPE connectivity_table entries returned but no new elements are available, the BS will drop the network entry packets.

CPE_IP_address: If the CPE IP address is zero the CPE with MAC address CPE_MAC_address is not allowed to use IP address unless it runs through IP network entry.

CPE_VLAN_tag: The CPE VLAN tag is the tag that must be used by the BS for all packets that are not network entry packets for with CPE MAC address and CPE_IP_address. If this field is zero it means that there is no VLAN tag associated with this field and the packets must be sent with no tags for this CPE.

CPE_home_VLAN_flag: This field is to be used as a Boolean field today but it is strongly suggested that this field to be used as a bit field of first bit of a byte so that future extension to this field as generic flag usage will be possible. If this field is true, the IP network entry packets will use VLAN tags as configured in the BS, if this field is false the IP network entry packets will use the VLAN tags as indicated in the CPE_VLAN_tag field. The existence of a zero CPE_home_VLAN_flag and CPE_MAC_ address is zero is allowed and means that the unspecified CPE is to use the CPE_home_VLAN_ flag for IP network entry packets.

CPE_Connected_SS MAC_address: This field will always be populated when a CPE entry in connectivity_able exists. The field states that all the packets coming for this table entry must be coming though the SS whose MAC address is the same as CPE_Connected_SS_MAC_address.

CPE_Gateway_IP_address: This field must not be zero if the CPE_IP_address is not set to zero. If the CPE_IP_address is zero this field must be set or assumed as zero.

A connectivity table entry for a subscriber station can have the following format:

SS_MAC_address: The field must always be populated. The field indicates a registered SS with the MAC address.

SS_VLAN_tag: The SS_VLAN_tag is the tag that must be used by the BS for all packets that are not network entry packets for with SS_MAC_If this field is zero it means that there is no VLAN tag associated with this field and the packets must be sent with no tags for this SS.

SS_home_VLAN_flag: This field is to be used as a Boolean field today but it is strongly suggested that this field to be used as a bit field of first bit of a byte so that future extension to this field as generic flag usage will be possible. If this field is true, the IP network entry packets will use VLAN tags as configured in the BS, if this field is false the IP network entry packets will use the VLAN tags as indicated in the SS_VLAN_tag field.

Typically, a base station is configured with primary and secondary addresses that can be defined through DNS. Each wireless interface of a base station can have an SS_Home_VLAN_ID (HomeID) configured for the subscriber station. Where an SS_Home_VLAN_ID is not configured, the base station may refrain from tagging packets coming from the subscriber station. Where a CPE_Home_VLAN_ID is not configured for CPE's, the BS may not tag broadcast DHCP packets coming from the CPE. However, if the corresponding CPE_home_VLAN_flag is true, the CPE_VLAN_tag may be used as indicated in BS.10.

A base station is typically configured with a default CPE_Home_VLAN_ID for any CPE connected using PPPoE. Subnet settings may be maintained that take the form of address and mask where the address does not have to be an address belonging to the base station, and the VCI field is in a form having less than 255 octets. The base station in one example can be configured for at least 8 CPE_Home_VLAN_ID tags for CPE using IP subnet or VCI as a field.

In certain embodiments, a base station can intercept DHCP Discover messages coming from its wireless interface. The base station may tag the broadcast DHCP Discover messages with appropriate VLAN tag. In certain embodiments, upon reception of DHCP Offer message reply to broadcast DHCP DISCOVER message, the base station may create a connectivity_table_entry in its connectivity table using DHCP Offer information and a VLAN_ID provided in a corresponding DHCP Offer message and identification of a Gateway assigned to the CPE. In another example, a DHCP ACK message may be used in place of the DHCP Offer message.

Typically, a base station will create a connectivity_table_entry whenever it detects a broadcast PPPoE Active Discover Initiation packet using the PPPoE VLAN-ID for PPPoE CPE's. When a connectivity_table_entry is created via the DHCP process, the BS may update a centralized Persistent Storage (PS) with the connectivity_table_entry information. When the base station receives an ARP message/RARP message from its network interface that indicates the IP address belongs to some other SS/CPE, the BS may reset its connectivity_table_entry for that entity and update the PS. The base station may be able to age the connectivity_table_entry by changing its state from active to inactive per ARP table rules.

Upon receiving an IP packet from CPE, a base station may use its connectivity_table to check whether the packets IP and MAC address paired with connectivity_table_entry, and whether the pair is assigned to the SS with the right MAC address in the same connectivity_table_entry. Upon receiving a PPP packet from the CPE, a base station may use its connectivity_table to check whether the CPE is assigned to the SS with the right MAC address. The base station may tag every air-interface ingress packet with proper CPE_VLAN_tag as indicated in its connectivity_table_entry for the CPE using MAC address as the identifier. Upon receiving a packet through air-interface which is not IP network entry packet and is not within its connectivity_table, a base station may drop the packet and report the event and log it accordingly which is to be filtered by a switch in the CLI.

In certain embodiments, the architecture includes persistent storage for maintaining connectivity_table entries. Persistent storage typically can provide all connectivity_table entries associated with the SS_MAC_address. Typically, persistent storage can be updated upon discovery of new or changed information concerning the network. Updates may be automatic and, in some embodiments, a user may modify information maintained in the persistent storage.

Additional Descriptions of Certain Aspects of the Invention

Certain embodiments of the invention provide a method for managing a wireless network, comprising receiving a packet addressed to a subscriber station in a wireless network and assigning a tag to the packet based on a first base station at which the packet is received and a second base station at which the subscriber station first entered the network, wherein the tag identifies a network connection assigned to the subscriber station by the second base station. In certain of these embodiments, the tag identifies a media access address associated with subscriber equipment accessible through the subscriber station. In certain of these embodiments, the tag identifies an IP address associated with the subscriber equipment. In certain of these embodiments, the packet is addressed to the IP address. In certain of these embodiments, the assigning a tag includes identifying the tag in a list of tags maintained in a plurality of base stations. In certain of these embodiments, the assigning includes obtaining the tag from a table linking each of a plurality of virtual local area networks to one or more subscriber stations previously registered at a network base station.

Furthermore, certain embodiments of the invention provide a method for managing virtual local area networks ("VLANS"), comprising maintaining a table linking each of a plurality of network tags to a corresponding one of a plurality of unique identifiers, each network tag identifying an initial base station at which subscriber equipment initially entered a wireless network, receiving a packet at a base station the packet including an identifier of a certain subscriber equipment, tagging the packet with a network tag corresponding to the identifier, the network tag obtained by querying the table with the identifier, and directing the packet to the certain subscriber equipment regardless of its location in the wireless network. In certain of these embodiments, a second base station identifies the certain subscriber equipment from the table upon a subsequent entry of the certain subscriber equipment to the wireless network. In certain of these embodiments, the unique identifier includes an IP address associated with the subscriber equipment. In certain of these embodiments, the unique identifier includes a media access address associated with subscriber equipment accessible through a subscriber station. In certain of these embodiments, the unique identifier includes an IP address associated with a computing device accessible through the subscriber equipment. In certain of these embodiments, each of the plurality of network tags is unchanged by subsequent entries of corresponding subscriber equipment to the wireless network.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for managing a wireless network, comprising:
   receiving, at a first base station, a first packet from a subscriber station in a wireless network, the first packet originating from subscriber equipment accessible through the subscriber station, the first packet including an identifier of the subscriber equipment;
   obtaining, from a table, a network tag based on the identifier of the subscriber equipment, wherein the network tag identifies a network connection associated with a second base station at which the subscriber station first entered the wireless network, the table comprising a plurality of network tags corresponding to identifiers of subscriber equipment;
   assigning, at the first base station, the network tag to the first packet;
   forwarding the first packet from the first base station to a destination address included in the first packet;
   receiving, at the first base station, a second packet addressed to the subscriber equipment from the destination address, the second packet including the network tag; and
   removing the network tag from the second packet before the second packet is forwarded to the subscriber equipment through the subscriber station.

2. The method of claim 1, wherein the network tag identifies a media access control ("MAC") address associated with the subscriber equipment accessible through the subscriber station.

3. The method of claim 1, wherein the network tag identifies an Internet Protocol ("IP") address associated with the subscriber equipment accessible through the subscriber station.

4. The method of claim 3, wherein the first packet is addressed to the IP address.

5. The method of claim 1, wherein the table is maintained by the first base station.

6. The method of claim 1, further comprising forwarding the second packet to the subscriber equipment through the subscriber station.

7. A method for execution in a base station in a wireless network, the method comprising:
   maintaining at the base station a table operative to store:
      a media access control ("MAC") address of a customer premises equipment device ("CPE") that first entered the wireless network through another base station, the MAC address of the CPE being stored in a CPE MAC address field of a CPE entry associated with the CPE;
      an Internet Protocol ("IP") address of the CPE in a CPE IP address field of the CPE entry;
      a subscriber station MAC ("SS MAC") address of a subscriber station through which the CPE is accessible, the SS MAC address being stored in a CPE-connected SS MAC address field of the CPE entry; and
      a CPE virtual local area network ("VLAN") tag in a CPE VLAN tag field of the CPE entry;
   receiving, at the base station, a first wireless ingress packet from the CPE, including a received CPE MAC address, a received CPE IP address, and a received SS MAC address, wherein the first wireless ingress packet includes information that identifies the SS MAC address as that of the subscriber station through which the first wireless ingress packet from the CPE was received;
   adding the CPE VLAN tag to the first wireless ingress packet when it is determined that the received CPE MAC address matches the CPE MAC address field, the received CPE IP address matches the CPE IP address field, and the received SS MAC address matches the CPE-connected SS MAC address field, wherein the CPE VLAN tag associates the CPE with the other base station through which the CPE first entered the wireless network;

forwarding the first wireless ingress packet from the base station to a destination address included in the first wireless ingress packet;

receiving, at the base station, a network packet addressed to the CPE from the destination address, the network packet including the CPE VLAN tag; and removing the CPE VLAN tag from the network packet before the network packet is forwarded to the CPE through the subscriber station.

8. The method of claim 7, further comprising populating the CPE MAC address field with the MAC address of the CPE when the CPE MAC address field is zero.

9. The method of claim 7, further comprising:
facilitating IP network entry process when the CPE IP address field is zero; and
updating the IP network entry with a CPE IP address obtained in association with the IP network entry process.

10. The method of claim 7, further comprising determining whether to use the CPE VLAN tag by checking a CPE home VLAN flag value.

11. The method of claim 7, further comprising:
receiving a second wireless ingress packet at the base station;
determining whether the second wireless ingress packet is an IP network entry packet; and
dropping the second wireless ingress packet when it is determined that the second wireless ingress packet is not an IP network entry packet.

12. The method of claim 7, further comprising forwarding the network packet to the CPE through the subscriber station.

* * * * *